United States Patent [19]

Chen

[11] Patent Number: 5,694,113

[45] Date of Patent: Dec. 2, 1997

[54] EMERGENCY BRAKE MONITOR

[76] Inventor: Li-Teh Chen, P.O. Box 82-144, Taipei, Taiwan

[21] Appl. No.: 745,738

[22] Filed: Nov. 12, 1996

[51] Int. Cl.$^6$ .................................................. B60Q 1/44
[52] U.S. Cl. ...................... 340/479; 340/457; 340/457.3; 340/473; 180/282; 200/61.52
[58] Field of Search .............................. 340/453, 438, 340/473, 479, 457, 457.3; 180/271, 282; 200/61.47, 61.52, 61.7

[56] References Cited

U.S. PATENT DOCUMENTS 4,185,268  1/1980  Sakakibara .................. 340/457.3

Primary Examiner—Jeffery Hofsass
Assistant Examiner—Timothy Edwards, Jr.
Attorney, Agent, or Firm—Alfred Lei

[57] ABSTRACT

An emergency brake monitor including a front cover formed with an opening at an upper portion thereof, a plurality of perforations below the opening, and a circular recess at one side thereof, a ball-shaped member formed with a radial bell-shaped neck having a passage extending through a diameter thereof, a photosensor arranged within the passage of the ball-shaped member, an adjusting knob including a cylindrical rod portion extending from one side of the adjusting knob, and electrical means electrically connected with the mercury switch and the photosensor, for producing warnings when receiving signal from the photosensor, whereby the driver will be reminded to release the emergency brake before the automobile starts to move.

1 Claim, 5 Drawing Sheets

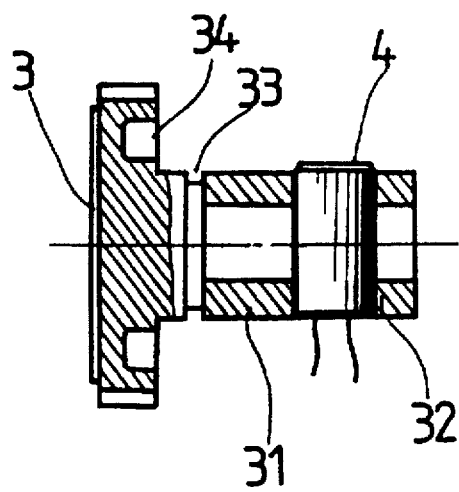
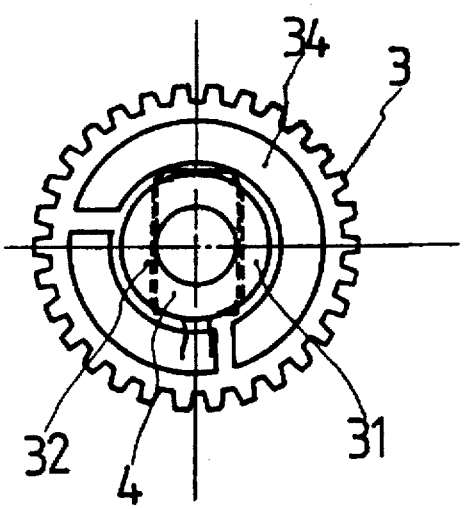
FIG. 4A  FIG. 4B
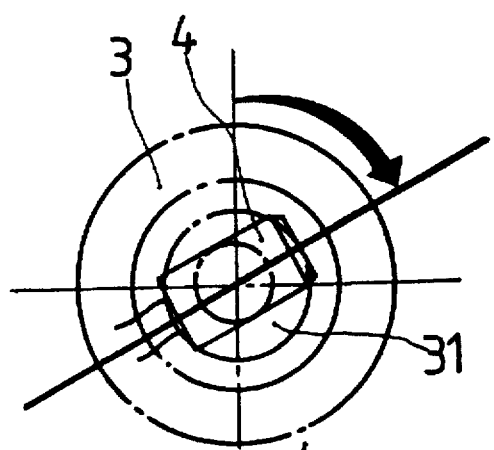
FIG. 5A
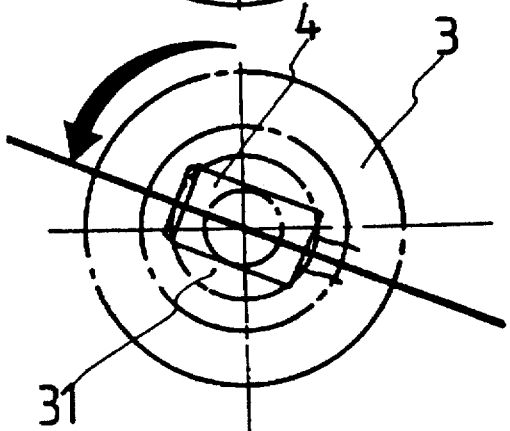
FIG. 5B

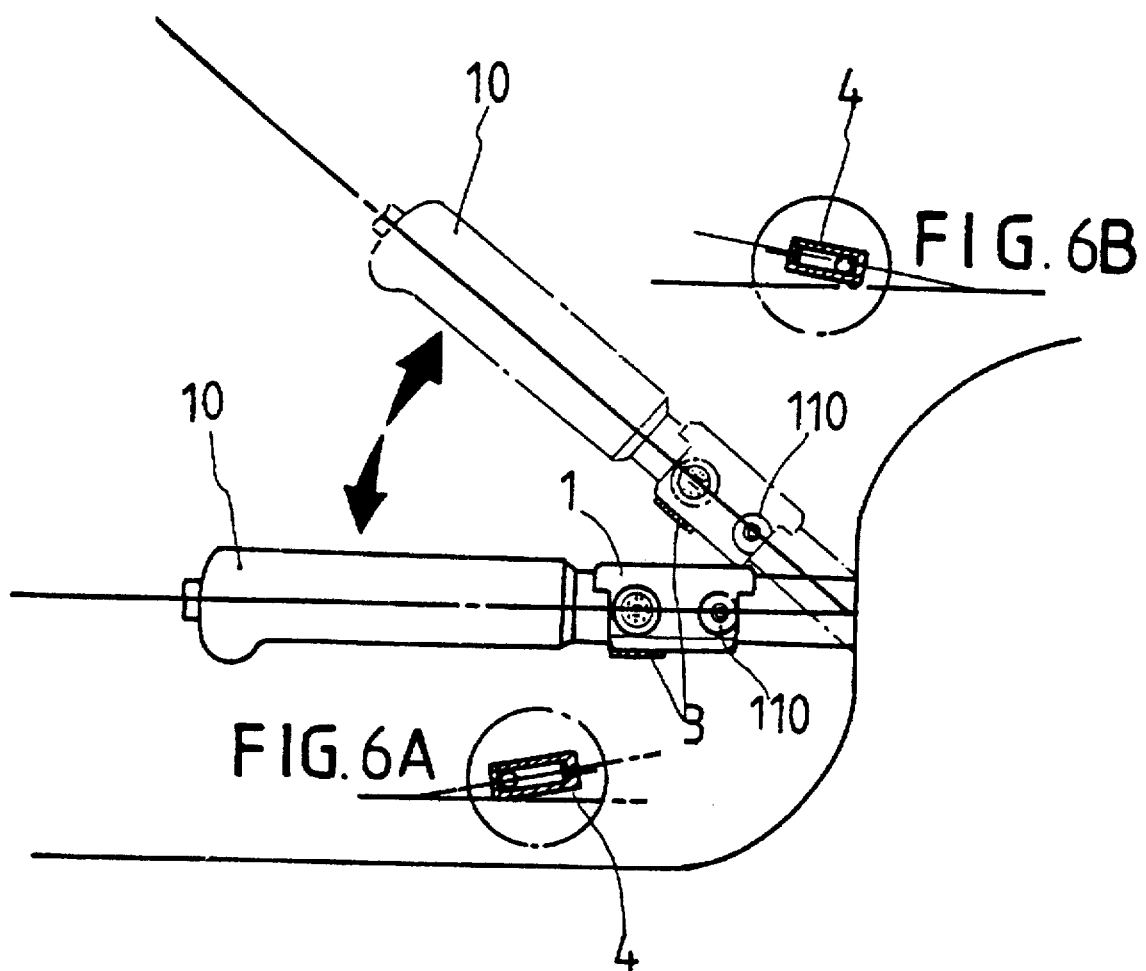

EMERGENCY BRAKE MONITOR

BACKGROUND OF THE INVENTION

1. Field of the Invention

This invention relates to an emergency brake monitor and in particular to one which will remind the driver to release the emergency brake before the automobile starts to move.

2. Description of the Prior Art

It has been found that the driving beginners often forget to release the emergency brake of an automobile before the automobile starts to move thereby damaging the emergency brake. Therefore, it is an object of the present invention to provide a device which will remind the driver to release the emergency brake before the automobile starts to move.

SUMMARY OF THE INVENTION

This invention relates to an emergency brake monitor which will notify a driver to release the emergency brake of an automobile before the automobile starts to move.

It is the primary object of the present invention to provide an emergency brake monitor which will send out a signal to remind a driver to release the hand brake of an automobile before the automobile starts to move.

It is another object of the present invention to provide an emergency brake monitor which can prevent the emergency brake of an automobile from being damaged.

It is still another object of the present invention to provide an emergency brake monitor which is simple in construction.

It is still another object of the present invention to provide an emergency brake monitor which is low in cost.

It is a further object of the present invention to provide an emergency brake monitor which is practical in use.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

BRIEF DESCRIPTION OF THE DRAWINGS

FIG. 4A is a sectional view of the adjusting knob;

FIG. 4B is an end elevational view of the adjusting knob;

FIGS. 5A and 5B illustrate how to use the adjusting knob to adjust the position of the mercury switch;

FIG. 6 illustrates how the mercury switch is affected by the position of the emergency brake.

DETAILED DESCRIPTION OF THE PREFERRED EMBODIMENT

Figure 1:
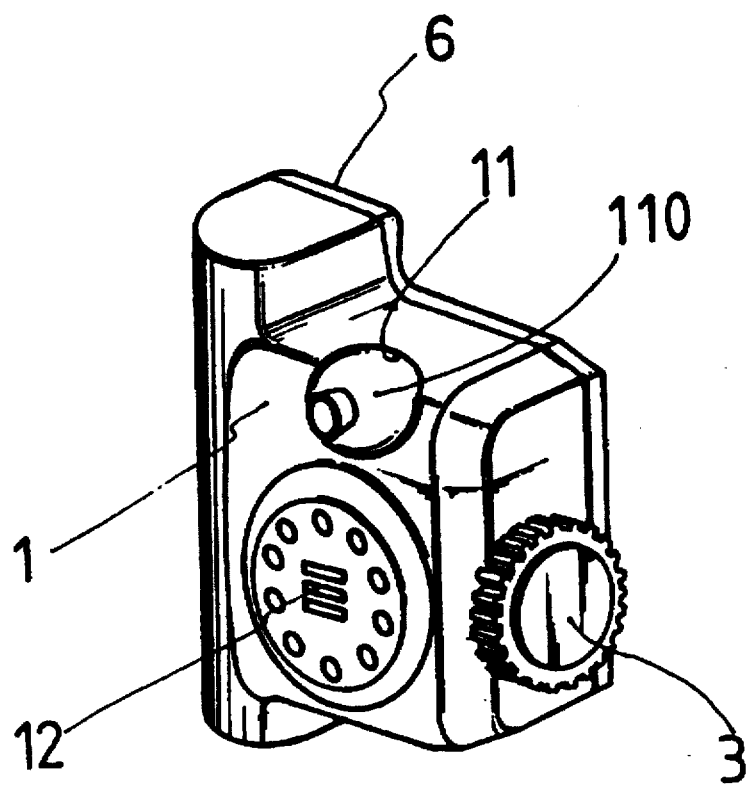
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
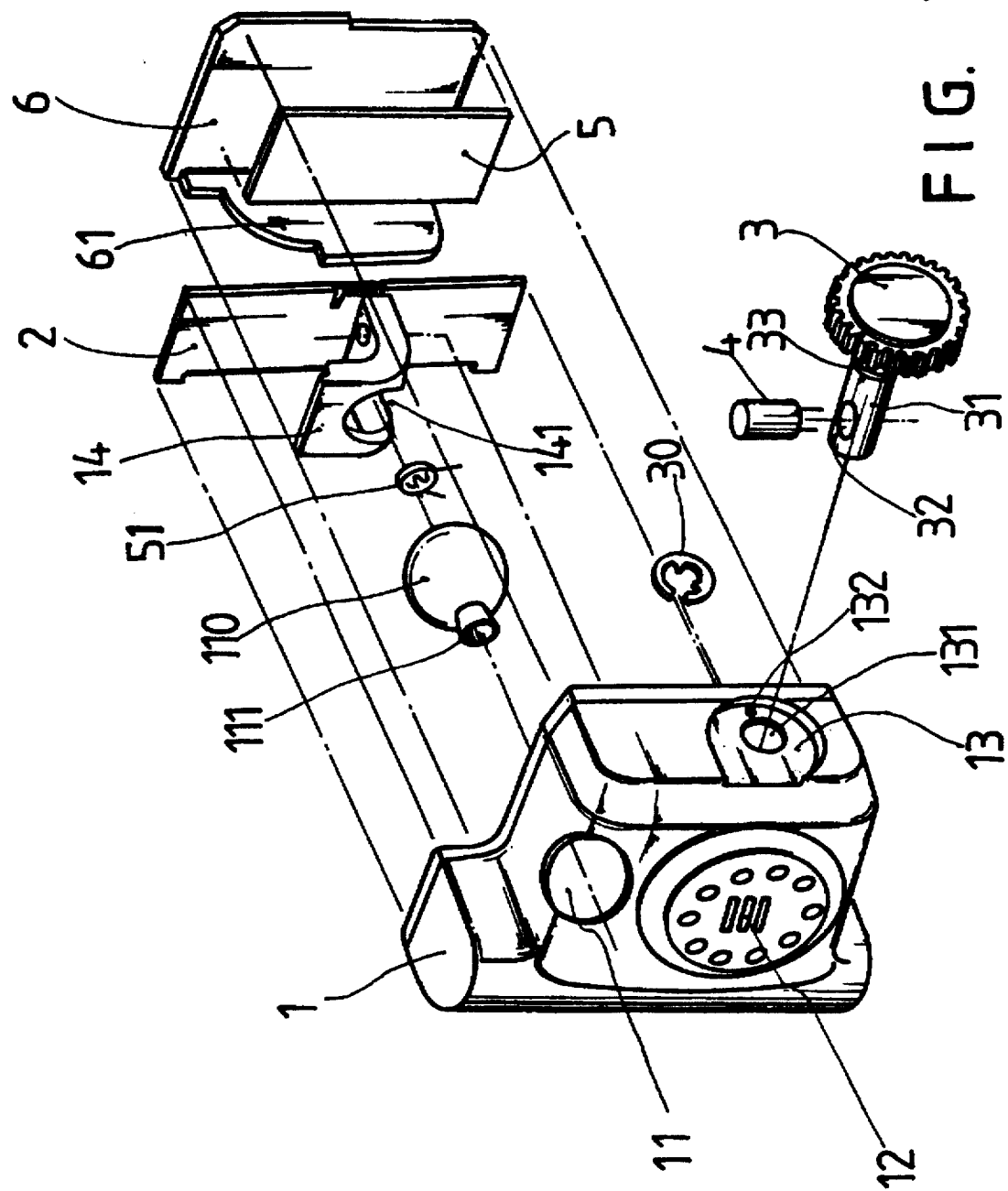
FIG. 3 is an exploded view of the present invention.
Figure 7:
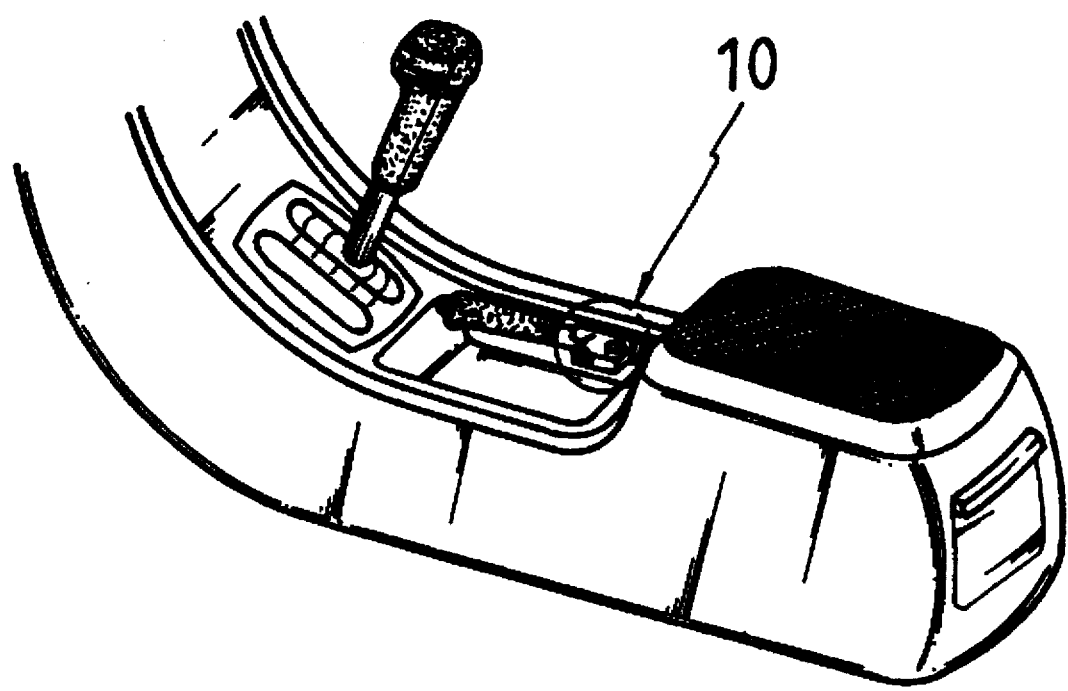
FIG. 7 is a working view of the present invention.

With reference to the drawings and in particular to FIGS. 1 and 3 thereof, the emergency brake monitor according to the present invention comprises a front cover 1, a battery cover 2, an adjusting knob 3, a mercury switch 4, a printed circuit board 5, a ball-shaped member 110, and a rear cover 6.

As shown in FIG. 3, the front cover 1 is formed with an opening 11 at an Upper portion, a plurality of slots 12 below the opening 11, and a circular recess 13 at one side. The circular recess 13 is provided with a protuberance 132 thereon and has a through hole 131 at the center. The rear cover 6 is adapted to engage with the rear side of the cover 1 to form a closed container.

Figure 2:
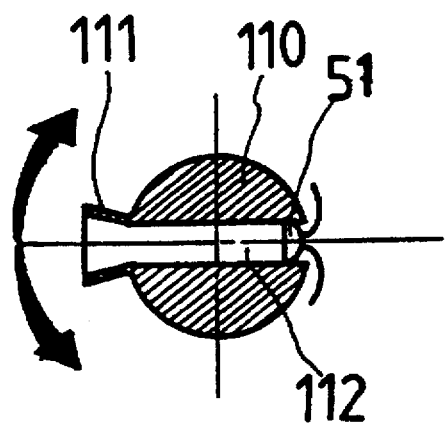
FIG. 2 is a sectional view of the ball-shaped member.

The ball-shaped member 110 is a spherical member formed with a radial bell-shaped neck 111 having a passage extending through the diameter of the spherical member. The ball-shaped member 110 is rotatably fitted in the front cover 1, with its bell-shaped neck 111 protruding out of the front cover 1. A photosensor 51 is arranged within the passage of the ball-shaped member 110 so that the photoresistor 51 will be rotated with the ball-shaped member 110 (see FIG. 2). The ball-shaped member 110 is kept in place by a holder 14.

The adjusting knob 3 includes a cylindrical rod portion 31 extending from one side of the adjusting knob 3. The cylindrical rod portion 31 of the adjusting knob 3 has a through hole 32 in which is force-fitted the mercury switch 4 (see FIGS. 4A and 4B) so that the mercury switch 4 can be easily adjusted in position simply by turning the adjusting knob 3. The mercury switch 4 is electrically connected with the photosensor 51. The inner side of the adjusting knob 3 is formed with a groove 34 adapted to receive the protuberance 132 on the circular recess 13 of the front cover 1 thereby limiting the turning range of the adjusting knob 3.

Batteries (not shown) are disposed within a battery chamber (not shown) of the front cover 1 and the battery chamber is closed with the battery cover 2. The structure of the battery chamber and the connection between the battery chamber and the battery cover 2 may be of any design well known to those having ordinary skill in the art and not considered a part of the present invention.

The photosensor 51 is electrically connected with an electrical means (not shown) on the printed circuit board 5 so that when the photosensor 51 senses the change of light, the photosensor 51 will send out a signal for to the electrical means which will then produce voice messages or the like reminding the driver to release the emergency brake before the automobile starts to move. The voice messages produced by the electrical means last for several seconds only. The electrical means is also well known in the art and need not described here in detail.

When in use, the emergency brake monitor according to the present invention is first mounted on a rear portion of an emergency brake and then the adjusting knob 3 is regulated so that when the emergency brake 10 is pulled up, the mercury switch 4 will be turned on thereby electrically connecting the photosensor 51 to the printed circuit board 5, and when the emergency brake 50 is released, the mercury switch 4 will be turned off thereby electrically disconnecting the photosensor 51 from the printed circuit board 5 (see FIGS. 5 and 6). Hence, when the driver opens the door and enters into the automobile, there will be a dramatic change of light intensity thus triggering the photosensor 51 and therefore activating the electrical means on the printed circuit board to produce voice message or the like to remind him to release the emergency brake before the automobile starts to move. Similarly, when the driver pulls up the emergency brake and opens the door to get out of the automobile, there will be also dramatic change of light intensity thus triggering the photosensor 51 and therefore activating the electrical means to produce voice messages. However, since the voice message lasts for several seconds only, it will not cause any trouble or inconvenience.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An emergency brake monitor comprising:

a front cover formed with an opening at an upper portion thereof, a plurality of perforations below said opening, and a circular recess at one side thereof, said circular recess being provided with a protuberance thereon and having a through hole at a center thereof;

a ball-shaped member formed with a radial bell-shaped neck having a passage extending through a diameter thereof, said ball-shaped member being rotatably fitted in said front cover with said bell-shaped neck protruding out of said front cover;

a photosensor arranged within said passage of said ball-shaped member;

an adjusting knob including a cylindrical rod portion extending from one side of said adjusting knob, said cylindrical rod portion of said adjusting knob having a through hole in which is force-fitted a mercury switch, an inner side of said adjusting knob being formed with a groove adapted to receive said protuberance; and electrical means electrically connected with said mercury switch and said photosensor, for producing warnings when receiving signal from said photosensor.

* * * * *